(12) United States Patent
Koo (10) Patent No.: US 7,443,201 B2
(45) Date of Patent: Oct. 28, 2008

(54) LOW VOLTAGE DIFFERENTIAL SIGNALING RECEIVER WITH A DIGITAL RESISTOR UNIT AND LOW VOLTAGE DIFFERENTIAL SIGNALING INTERFACE SYSTEM HAVING THE SAME

(75) Inventor: Kyung-Hoi Koo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 69 days.

(21) Appl. No.: 11/432,447

(22) Filed: May 11, 2006

(65) Prior Publication Data
US 2006/0267634 A1    Nov. 30, 2006

(30) Foreign Application Priority Data
May 31, 2005    (KR) .................. 10-2005-0046319

(51) Int. Cl.
*H03K 17/16*    (2006.01)
(52) U.S. Cl. ....................................................... 326/82
(58) Field of Classification Search .................... 326/30
See application file for complete search history.

(56) References Cited
U.S. PATENT DOCUMENTS 6,605,958 B2    8/2003    Bergman et al. .............. 326/30
7,102,381 B2 *  9/2006    Chen et al. ..................... 326/30
7,148,720 B2 * 12/2006    Chen ............................. 326/30

FOREIGN PATENT DOCUMENTS

JP    2003-29895    10/2003
KR    1020000010659 A    2/2000

* cited by examiner

*Primary Examiner*—Rexford Barnie
*Assistant Examiner*—Thienvu V Tran
(74) *Attorney, Agent, or Firm*—Myers Bigel Sibley & Sajovec, P.A.

(57) ABSTRACT

A low voltage differential signaling (LVDS) receiver includes a digital resistor unit configured to detect a voltage difference between a differential signal pair indicative of a digital signal, in which the digital resistor unit has a resistance value that may be varied in response to at least one control signal, a receiver unit configured to generate the digital signal in response to the detected voltage difference between the differential signal pair, and a resistance adjustment unit configured to provide the at least one control signal to the digital resistor unit to adjust the resistance value of the digital resistor unit.

18 Claims, 9 Drawing Sheets

LOW VOLTAGE DIFFERENTIAL SIGNALING RECEIVER WITH A DIGITAL RESISTOR UNIT AND LOW VOLTAGE DIFFERENTIAL SIGNALING INTERFACE SYSTEM HAVING THE SAME

CROSS REFERENCE TO RELATED APPLICATION AND CLAIM OF PRIORITY

This application claims priority under 35 USC § 119 to Korean Patent Application No. 10-2005-0046319, filed on May 31, 2005, the contents of which are herein incorporated by reference in its entirety.

FIELD OF THE INVENTION

The present invention relates to a low voltage differential signaling (LVDS) receiver and an LVDS interface system having an LVDS receiver.

BACKGROUND

Low voltage differential signaling (LVDS) interface systems, which may have high speed operation, lower current consumption and/or lower electromagnetic interference (EMI), are used in various applications, such as semiconductor memory devices, liquid crystal display devices, communication terminals, etc.

Figure 1:
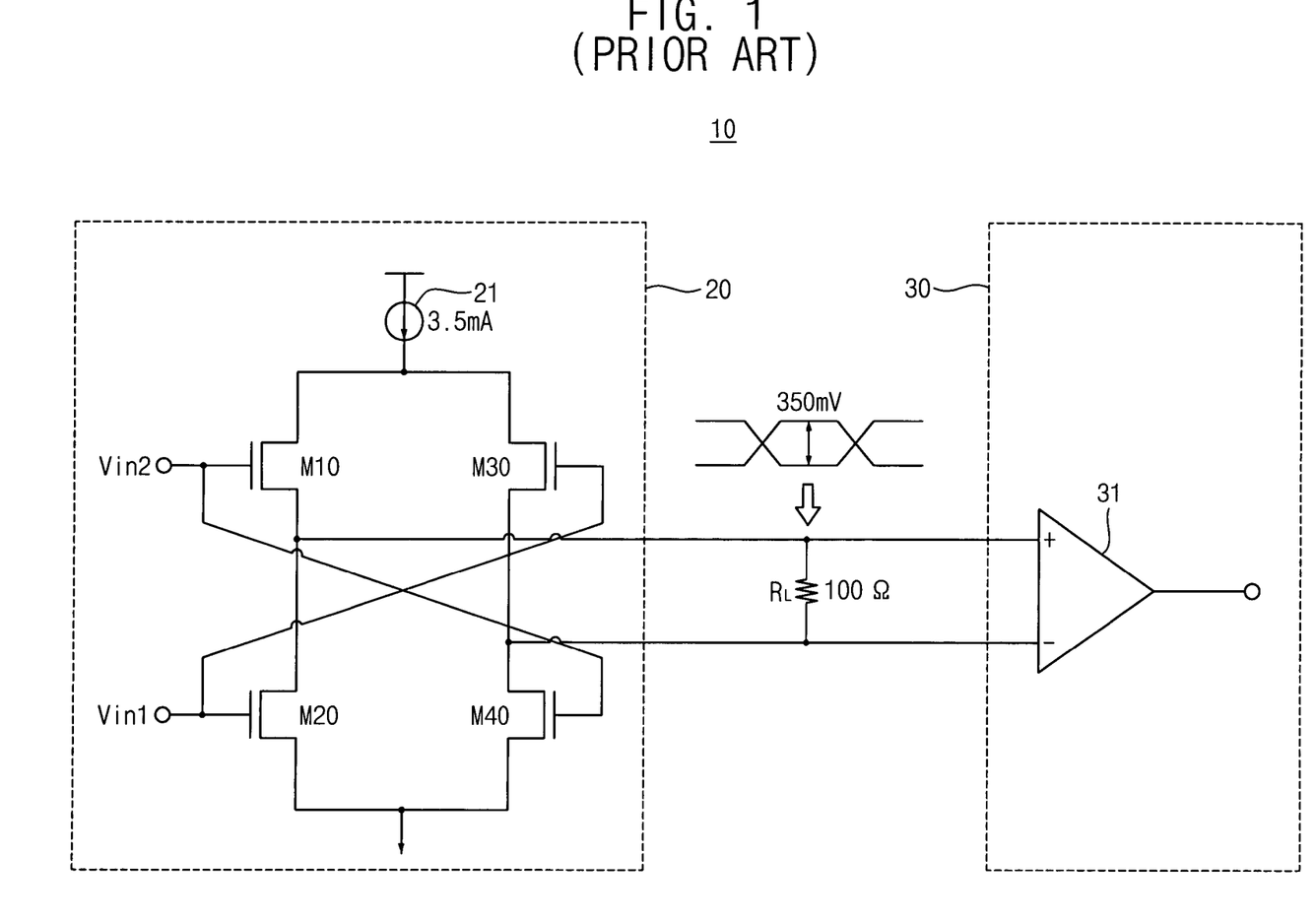
FIG. 1 is a circuit diagram illustrating a conventional low voltage differential signaling (LVDS) interface system.

FIG. 1 is a circuit diagram illustrating a conventional low voltage differential signaling (LVDS) interface system 10.

Referring to FIG. 1, the LVDS interface system 10 includes a low voltage differential signaling (LVDS) driver 20 and a low voltage differential signaling (LVDS) receiver 30. The LVDS driver 20 is used to transmit a low voltage differential signal pair in response to a digital signal Vin1 and an inverted digital signal Vin2 to the LVDS receiver 30. The LVDS receiver 30 includes an external resistor $R_L$ that detects a voltage difference between the low voltage differential signal pair and a receiver unit 31 that restores the original digital signal Vin1 based on the detected voltage difference between the low voltage differential signal pair.

The LVDS driver 20 and the LVDS receiver 30 may be implemented as a chip and an external resistor $R_L$ may be disposed between the LVDS driver 20 and the LVDS receiver 30.

The LVDS driver 20 includes a current source 21 and four transistors M10, M20, M30 and M40. The current source 21 may provide a predetermined electric current, for example, about 3.5 mA.

When the digital signal Vin1 has a logic low level and the inverted digital signal Vin2 has a logic high level, a first transistor M10 and a fourth transistor M40 are turned on so that a current may flow through the external resistor $R_L$ in a first direction. Conversely, when the digital signal Vin1 has a logic high level and the inverted digital signal Vin2 has a logic low level, a second transistor M20 and a third transistor M30 are turned on so that a current may flow through the external resistor $R_L$ in a second direction that is opposite to the first direction.

Thus, the voltage difference between the low voltage differential signal pair may be detected across the external resistor $R_L$. The current generated by the current source 21 is about 3.5 mA and the external resistor $R_L$ is 100Ω so that the voltage across the external resistor $R_L$ is about 3.5 mA×100Ω=350 mV.

As described above, the voltage difference between the low voltage differential signal pair is determined as the voltage across the external resistor $R_L$ disposed at a receiving end of the LVDS receiver 30 and has a voltage level of, for example, about 350 mV. Thus, the external resistor $R_L$ may be required in the conventional LVDS interface system 10.

In addition, the LVDS interface system 10 is often required to cover multiple channels, not only a single channel. In this circumstance, the LVDS interface system 10 may include as many external resistors $R_L$ as the number of the channels.

Figure 2:
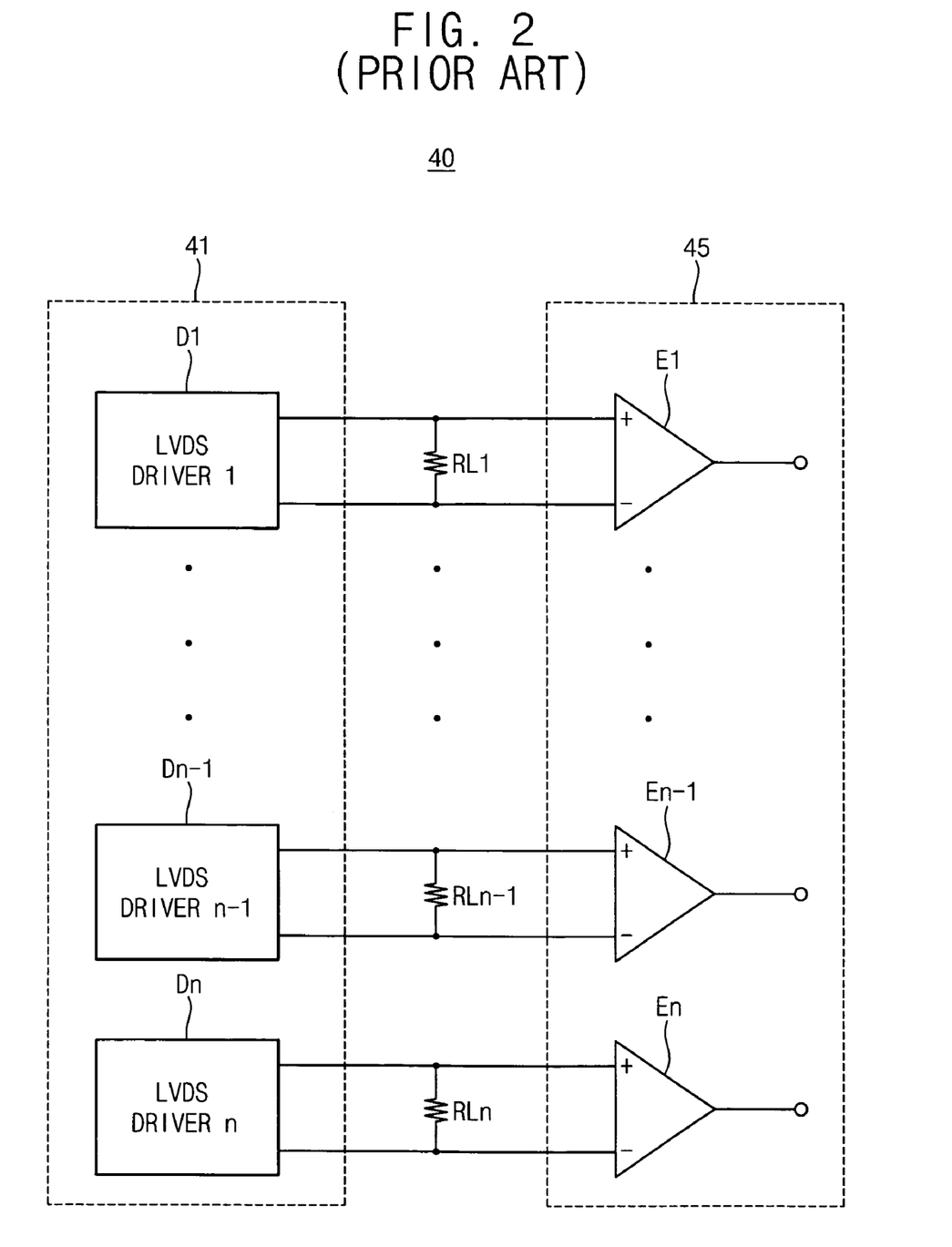
FIG. 2 is a circuit diagram illustrating a conventional low voltage differential signaling (LVDS) interface system having n channels.

FIG. 2 is a circuit diagram illustrating a conventional low voltage differential signaling (LVDS) interface system 40 having n channels.

Referring to FIG. 2, the conventional LVDS interface system 40 includes low voltage signal drivers 41 D1 through Dn and low voltage signal receivers 45 E1 through En. A plurality of external resistors RL1 through RLn are disposed between the LVDS drivers D1 through Dn and the LVDS receivers E1 through En, respectively. Thus, n external resistors RL1 through RLn are included in the conventional LVDS interface system 40. In addition, as the number of channels is increased, the number of the external resistors that are disposed exterior to a chip is also increased.

Since the conventional LVDS interface system includes the external resistors, the conventional LVDS interface system has the following disadvantages.

First, since the external resistor is not integrated on a chip where the LVDS driver or the LVDS receiver is formed, a signal characteristic of the transmitted signal may be lowered due to the use of interconnections, etc. For instance, in a conventional LVDS system, a waveform applied to the LVDS receiver may be easily distorted, and a jitter characteristic may be deteriorated.

Second, as the number of channels is increased, the number of external resistors required is also increased. Therefore, installing the external resistors in the LVDS receiver may become difficult and/or the cost may be increased. This problem may become more serious as the number of channels employed is increased.

Third, as the external resistor has a fixed resistance value, the external resistor for each channel may need to be replaced with a new external resistor having a desired resistance value in order to change the resistance value.

As described above, the conventional LVDS interface system may have some disadvantages in that the performance of the LVDS interface system may be lowered due to the use of the external resistor, installation may become difficult, the cost may be increased and/or the resistance value of a receiving end may not be easily modified, etc. Those problems may become more serious as the number of channels employed is increased.

SUMMARY

A low voltage differential signaling (LVDS) receiver according to some embodiments of the invention includes a digital resistor unit configured to detect a voltage difference between a differential signal pair indicative of a digital signal, in which the digital resistor unit has a resistance value that may be varied in response to at least one control signal, a receiver unit configured to generate the digital signal in response to the detected voltage difference between the differential signal pair, and a resistance adjustment unit configured to provide the at least one control signal to the digital resistor unit to adjust the resistance value of the digital resistor unit.

The digital resistor unit may include a plurality of transistors that are coupled in parallel to one another, each of the transistors being turned on by a corresponding control signal from the resistance adjustment unit. Each of the transistors may be a MOS transistor. Furthermore, each of the transistors of the digital resistor unit may have a resistance value that may be different from each other transistor of the digital resistor unit.

The resistance adjustment unit may be configured to generate the at least one control signal based on a resistance of a reference resistor.

The at least one control signal may be provided to the digital resistor unit such that a resistance of the digital resistor unit may be approximately equal to a resistance of the reference resistor.

The resistance adjustment unit may include a reference digital resistor unit coupled in series to the reference resistor at a first node and configured to divide a power supply voltage, a comparator configured to compare a reference voltage with a voltage at the first node, and a digital logic unit configured to generate the at least one control signal in response to a comparison result from the comparator. The digital logic unit is further configured to provide the at least one control signal to the reference digital resistor unit such that the voltage at the first node may be equal to the reference voltage, and is further configured to provide the at least one control signal to the digital resistor unit. The reference voltage may be one half of the power supply voltage.

The reference digital resistor unit may include transistors coupled in parallel to one another, each of the transistors being turned on by the at least one corresponding control signal from the digital logic unit. The digital resistor unit may have a configuration substantially similar to the reference digital resistor unit.

The at least one control signal may include digital code having a number of bits, each of which corresponds to a respective transistor of the reference digital resistor unit.

A low voltage differential signaling (LVDS) receiver according to further embodiments of the invention includes a digital resistor unit configured to detect a voltage difference between a differential signal pair indicative of a digital signal, In which the digital resistor unit has a resistance value that may be varied in response to at least one external control signal, and a receiver unit configured to generate the digital signal in response to the detected voltage difference between the differential signal pair.

The digital resistor unit may include a plurality of transistors that are coupled in parallel to one another, each of the transistors being turned on by a corresponding control signal. Each of the transistors may include a MOS transistor. Furthermore, each of the transistors of the digital resistor unit may have a resistance value that may be different from each other transistor of the digital resistor unit.

A low voltage differential signaling (LVDS) receiver according to some further embodiments of the invention includes a digital resistor unit array having a plurality of digital resistor units coupled in parallel to one another and configured to detect a voltage difference between a differential signal pair indicative of a digital signal, in which the digital resistor unit array has a resistance value that may be varied in response to at least one external control signal, and a receiver unit configured to generate the digital signal in response to the detected voltage difference between the differential signal pair.

Each of the digital resistor units may include a plurality of transistors that are coupled in parallel to one another, each of the transistors being turned on by at least one corresponding control signal. Each of the transistors may include a MOS transistor.

A low voltage differential signaling (LVDS) interface system according to still further embodiments of the invention includes an LVDS driver configured to generate a differential signal pair indicative of a digital signal to be transmitted, and a digital resistor unit configured to detect a voltage difference between the differential signal pair that is transmitted from the LVDS driver, in which the digital resistor unit has a resistance value that may be varied in response to at least one control signal. The LVDS interface system further includes a receiver unit configured to restore the digital signal based on the detected voltage difference between the differential signal pair, and a resistance adjustment unit configured to provide the at least one control signal to the digital resistor unit to adjust the resistance value of the digital resistor unit.

The digital resistor unit may include a plurality of transistors that are coupled in parallel to one another, each of the transistors being turned on by a corresponding control signal. Each of the transistors may comprise a MOS transistor. Each of the transistors of the digital resistor unit may have a resistance value that may be different from each other transistor of the digital resistor unit.

The LVDS interface system may further include a reference resistor, and the at least one control signal may be generated in response to a voltage across the reference resistor.

The control signal may be generated such that a resistance of the digital resistor unit may be approximately equal to a resistance of the reference resistor.

The resistance adjustment unit may include a reference digital resistor unit coupled in series to the reference resistor at a first node, and configured to divide a power supply voltage, a comparator configured to compare a reference voltage with a voltage at the first node, and a digital logic unit configured to generate the at least one control signal based on a comparison result from the comparator such that the voltage at the first node may be approximately equal to the reference voltage, and further configured to provide the at least one control signal to the digital resistor unit. The reference voltage may be one half of the power supply voltage.

The reference digital resistor unit may include transistors coupled in parallel to one another. Each of the transistors of the reference digital resistor unit may be turned on by the at least one corresponding control signal. The digital resistor unit may have a configuration substantially similar to the reference digital resistor unit.

The at least one control signal may include a digital code having a number of bits, each of which corresponds to a respective transistor of the reference digital resistor unit.

A low voltage differential signaling (LVDS) interface system according to some further embodiments of the invention includes an LVDS driver configured to generate a differential signal pair indicative of a digital signal to be transmitted, a digital resistor unit configured to detect a voltage difference between the differential signal pair, in which the digital resistor unit has a resistance value that may be varied in response to at least one external control signal, and a receiver unit configured to restore the digital signal in response to the detected voltage difference between the differential signal pair.

The digital resistor unit may include a plurality of transistors that are coupled in parallel to one another, each of the transistors of the digital resistor unit being turned on by the at least one corresponding control signal. Each of the transistors may include a MOS transistor.

A low voltage differential signaling (LVDS) interface system according to some embodiments of the invention includes an LVDS driver configured to generate a differential signal pair indicative of a digital signal to be transmitted, a digital resistor unit array having a plurality of digital resistor units coupled in parallel to one another and configured to detect a voltage difference between the differential signal pair that is transmitted from the LVDS driver, in which the digital resistor unit has a resistance value that may be varied in response to at least one external control signal, and a receiver unit configured to restore the digital signal in response to the voltage detected voltage difference between the differential signal pair.

Each of the digital resistor units may include a plurality of transistors that are coupled in parallel to one another, each of the transistors of the digital resistor units being turned on by at least one corresponding control signal.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Some embodiments the invention winnow be described in detail with reference to the accompanying drawings.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 3:
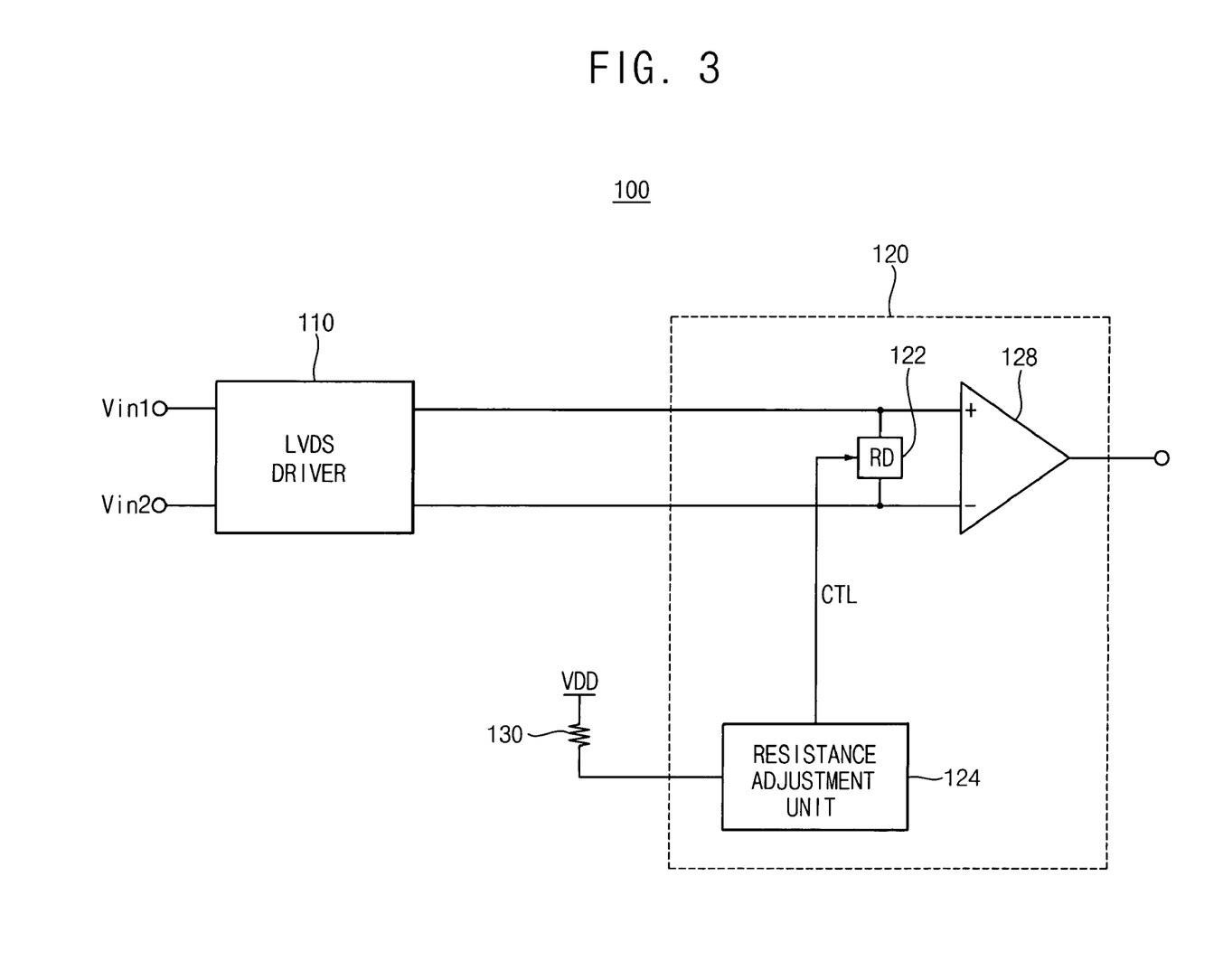
FIG. 3 is a circuit diagram illustrating a low voltage differential signaling (LVDS) interface system according to some embodiments of the invention.

FIG. 3 is a circuit diagram illustrating a low voltage differential signaling (LVDS) interface system 100 having a single channel according to some embodiments of the invention.

Referring to FIG. 3, the LVDS interface system 100 may include a low voltage differential signaling (LVDS) driver 110 and a low voltage differential signaling (LVDS) receiver 120. The LVDS driver 110 and the LVDS receiver 120 may each be implemented on a single chip and/or as one or more multi-chip modules and/or circuits.

The LVDS driver 110 receives a digital signal Vin1 and an inverted digital signal Vin2 and responsively transmits a low voltage differential signal pair to the LVDS receiver 120. A low voltage differential signal pair generated in response to the digital signal Vin1 and the inverted digital signal Vin2 corresponds to a voltage across a digital resistor unit 122 in the LVDS receiver 120 instead of an external resistor of the conventional LVDS interface system.

The LVDS receiver 120 may include the digital resistor unit 122, a resistance adjustment unit 124 and a receiver unit 128.

The digital resistor unit 122 is disposed at a receiving end of the LVDS receiver 120 to detect the low voltage differential signal pair received from the LVDS driver 110. In some embodiments, the digital resistor unit 122 may include a transistor array in which transistors are respectively turned on by a corresponding control signal CTL input from the resistance adjustment unit 124.

Figure 4:
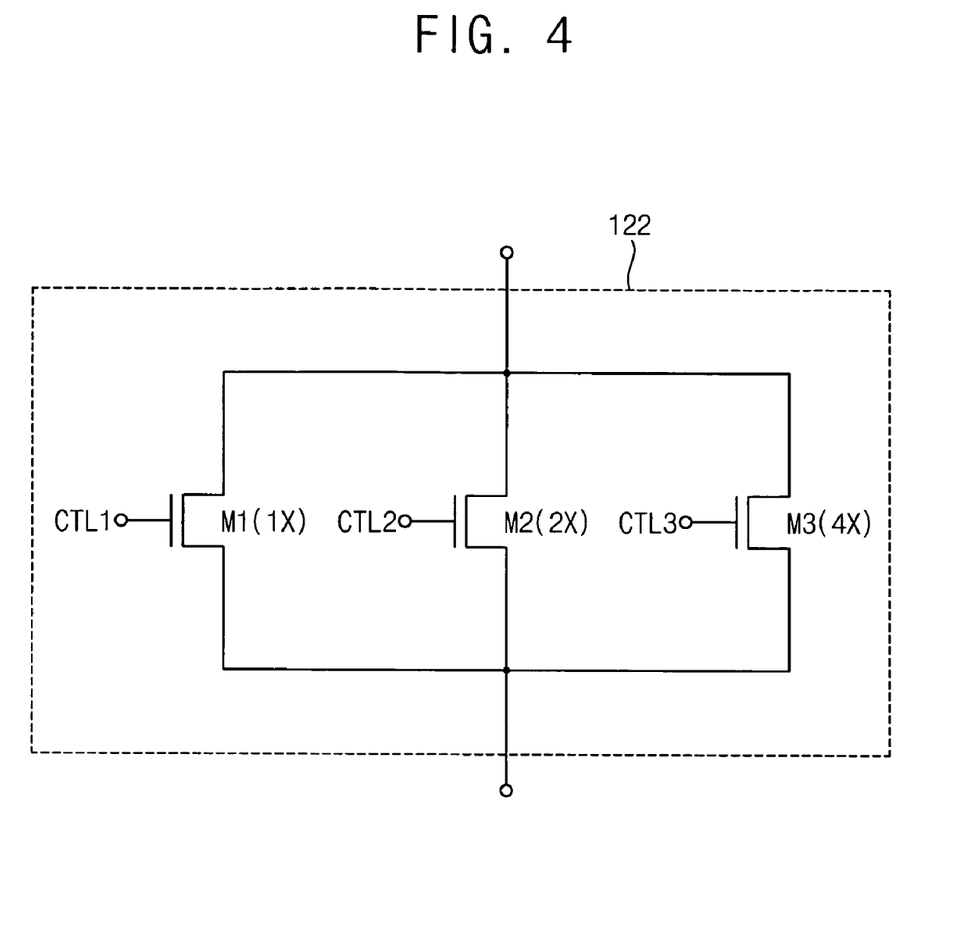
FIG. 4 is a circuit diagram illustrating a digital resistor unit of FIG. 3 according to some embodiments of the invention.

FIG. 4 is a circuit diagram illustrating the digital resistor unit 122 of FIG. 3 according to some embodiments of the invention.

Referring to FIG. 4, the digital resistor unit 122 includes three MOS transistors—a first MOS transistor M1, a second MOS transistor M2 and a third MOS transistor M3 that are coupled in parallel to one another. The first through third MOS transistors M1, M2, M3 are turned on by a first control signal CTL1, a second control signal CTL2 and a third control signal CTL3 input from the resistance adjustment unit 124, respectively.

When the first MOS transistor M1 has the resistance of 1×, the second MOS transistor has the resistance twice (2×) the resistance of the first MOS transistor M1 and the third MOS transistor has the resistance four times (4×) the resistance of the first MOS transistor M1.

Therefore, using the control signals CTL1, CTL2 and CTL3 from the resistance adjustment unit 124, a variable resistance value may be generated. Although the digital resistor unit 122 in FIG. 4 has three MOS transistors M1, M2 and M3, it is noted that the number of MOS transistors of the digital resistor unit 122 and the resistance of the MOS transistors may vary in different embodiments.

Referring again to FIG. 3, the receiver unit 128 receives the low voltage differential signal pair across the digital resistor unit 122 and restores an original signal, i.e., the digital signal Vin1 based on a voltage difference across the digital resistor unit 122.

The resistance adjustment unit 124 generates the control signal CTL referring to the resistance of a reference resistor 130 that is exterior to the LVDS receiver 120, and provides the control signal CTL to the digital resistor unit 122 to adjust the resistance of the digital resistor unit 122.

Figure 5:
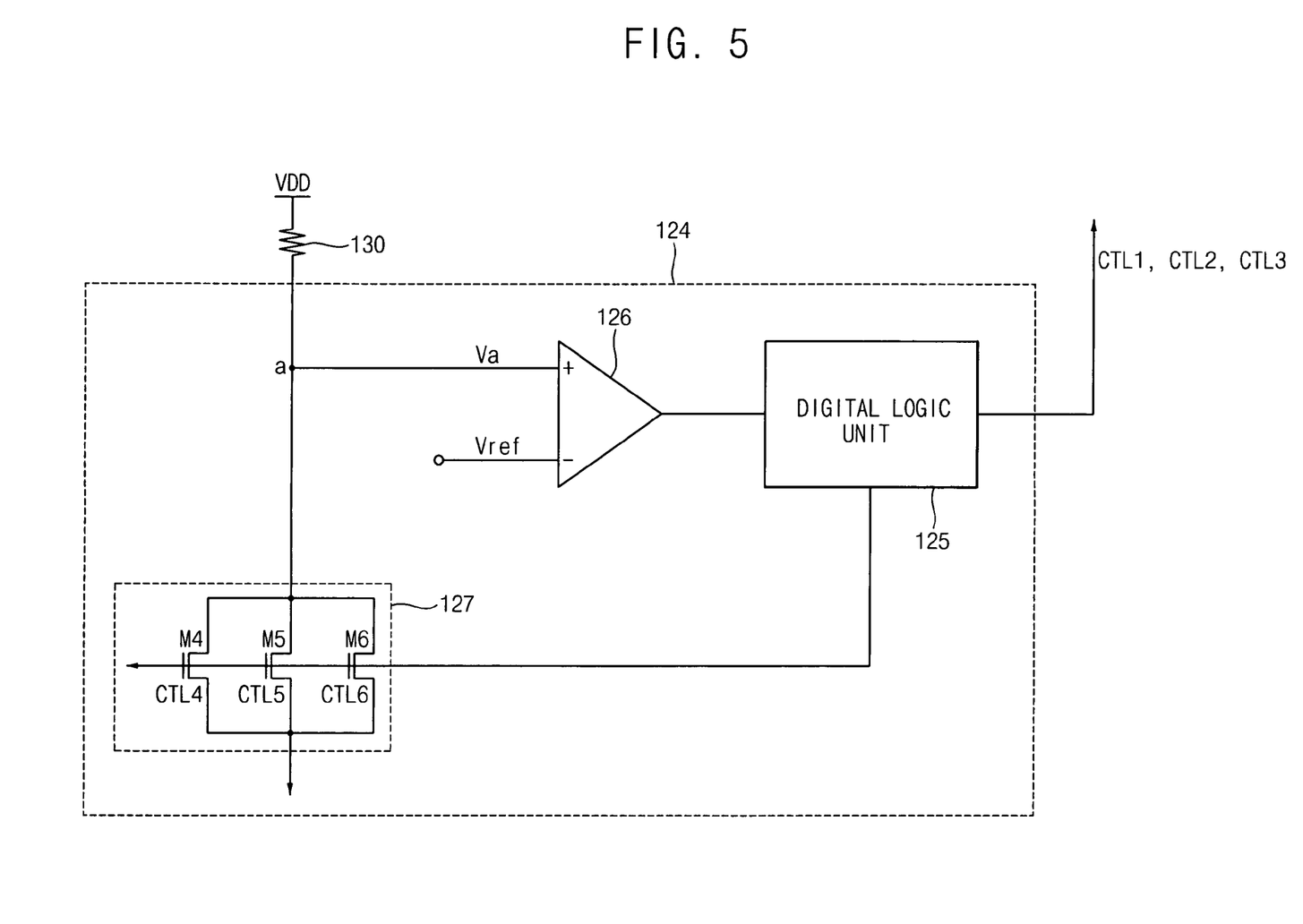
FIG. 5 is a circuit diagram illustrating a resistance adjustment unit of FIG. 3 according to some embodiments of the invention.

FIG. 5 is a circuit diagram illustrating a resistance adjustment unit of FIG. 3.

Referring to FIGS. 3 through 5, the resistance adjustment unit 124 includes a reference digital resistor unit 127, a comparator 126 and a digital logic unit 125.

The reference digital resistor unit 127 is serially coupled to the reference resistor 130 to divide a power supply voltage. The reference digital resistor unit 127 may include a transistor array, for example, having MOS transistors M4, M5 and M6 that are respectively turned on by control signals CTL4, CTL5 and CTL6 provided from the digital logic unit 125. The reference digital resistor unit 127 may have a configuration similar to the digital resistor 122.

Namely, the MOS transistors M4, M5 and M6 of the reference digital resistor unit 127 may be parallel coupled to one another and a fourth MOS transistor M4 may have the same resistance as that of the first MOS transistor M1, a fifth MOS transistor M5 may have the same resistance as that of the second MOS transistor M2 and a sixth MOS transistor M6 may have the same resistance as that of the third MOS transistor M3.

The fourth through sixth MOS transistors M4, M5 and M6 are respectively turned on by fourth through sixth control signals CTL4, CTL5 and CTL6 that are input from the digital logic unit 125.

The comparator 126 compares a reference voltage Vref and a voltage Va at a node a between the reference resistor 130 and the reference digital resistor unit 127. The comparator 126 provides a comparison result to the digital logic unit 125.

Based on the comparison result of the comparator 126, the digital logic unit 125 generates the fourth through sixth control signals CTL4, CTL5, CTL6 such that the voltage Va at the node a has the same voltage level as the reference voltage Vref. The digital logic unit 125 provides the fourth through sixth control signals CTL4, CTL5 and CTL6 as the first through third control signals CTL1, CTL2 and CTL3 to the digital resistor unit 122. Specifically, the fourth through sixth control signals CTL4, CTL5 and CTL6 by which the voltage Va at the node a is forced to the same voltage level with the reference voltage Vref, are respectively applied to the MOS transistors M1, M2 and M3 of the digital resistor unit 122 as the first through third control signals CTL1, CTL2 and CTL3.

Figure 6:
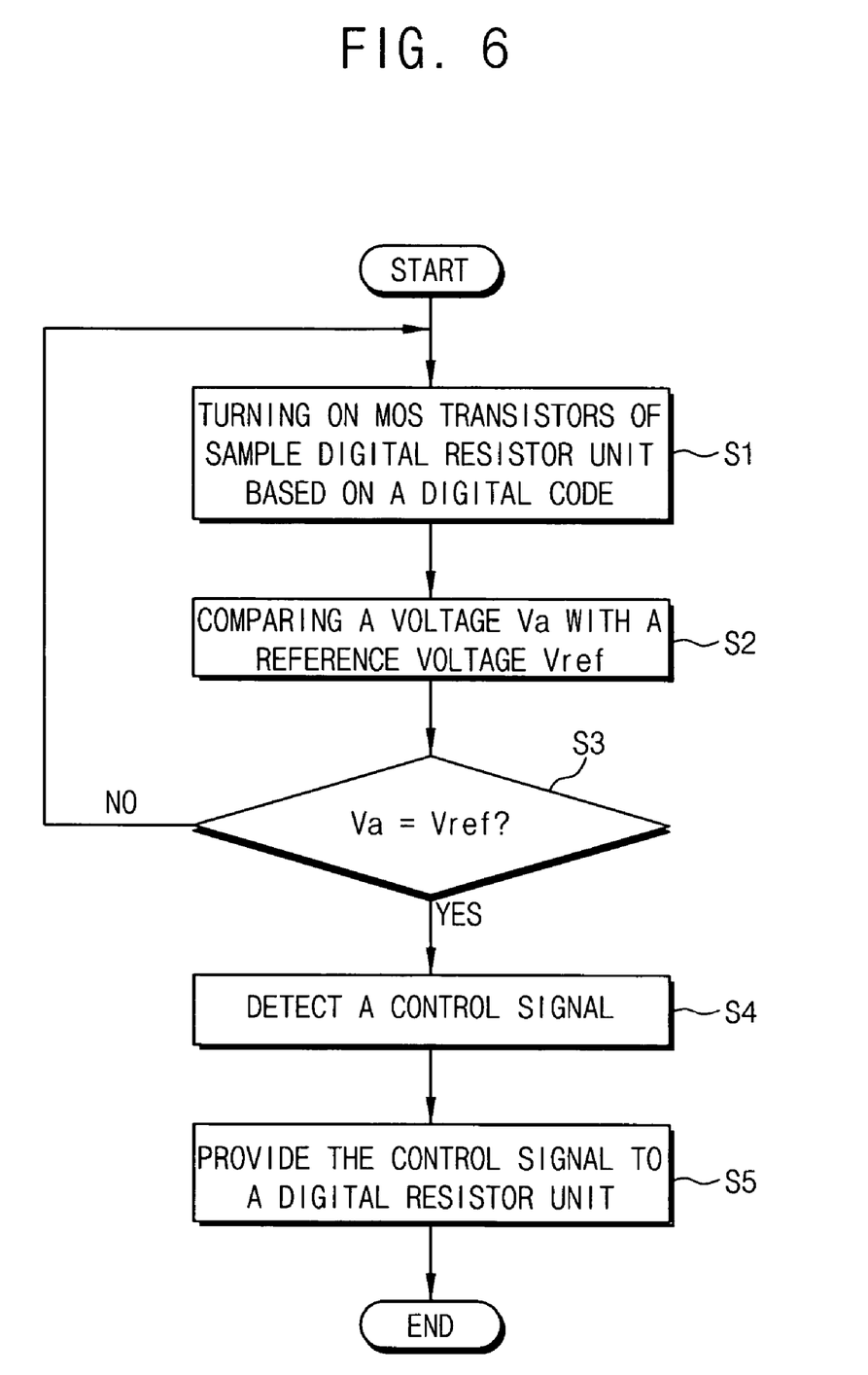
FIG. 6 is a flowchart diagram illustrating an operation of the resistance adjustment unit of FIG. 5 according to some embodiments of the invention.

FIG. 6 is a flowchart diagram illustrating operations of the resistance adjustment unit 124 of FIG. 5 according to some embodiments of the invention. In particular, operations of the resistance adjustment unit 124 will be described in more detail with reference to FIGS. 3 through 6.

The fourth through sixth control signals CTL4, CTL5 and CTL6 are provided from the digital logic unit 125 to the fourth through sixth MOS transistors M4, M5 and M6 of the reference digital resistor unit 127 to sequentially turn on the MOS transistors M4, M5 and M6 (step S1).

The fourth through sixth control signals CTL4, CTL5 and CTL6 may be set as a digital code value in the digital logic unit 125. The digital code value may have three bits. For example, the most significant bit (MSB) of the digital code may correspond to the fourth control signal CTL4, the middle bit may correspond to the fifth control signal CTL5 and the least significant bit (LSB) may correspond to the sixth control signal CTL6.

According to the digital code value set in the digital logic unit 125, each of the MOS transistors M4, M5 and M6 is turned on. For example, when the digital code has a binary value "001", the fourth and fifth control signals CTL4 and CTL5 have logic low levels and the sixth control signal CTL6 has a logic high level so that only the sixth MOS transistor M6 is turned on or off. In this manner, the resistance of the reference digital resistor 127 may be adjusted.

The comparator 126 receives the reference voltage Vref and compares the reference voltage Vref with the voltage Va at the node a between the reference resistor 130 and the reference voltage Vref (step S2). The comparison result is provided to the digital logic unit 125.

The digital logic unit 125 determines whether the voltage Va at the node a is the same as the reference voltage Vref based on the comparison result (step S3). For example, the digital logic unit 125 may determine if the difference between the voltage Va at the node a and the reference voltage Vref is less than a predetermined voltage difference ΔV. If the voltage Va is not the same as the reference voltage Vref, the digital logic unit 125 modifies the digital code value for the fourth through sixth control signals CTL4, CTL5 and CTL6 until the voltage Va at the node a becomes about the same voltage level with the reference voltage Vref (i.e. until the difference between the voltage Va at the node a and the reference voltage Vref is less than ΔV.

For example, when the reference voltage Vref input to the comparator 126 has a voltage level of VDD/2, the digital logic unit 125 may set the digital code value such that the voltage Va at the node a becomes VDD/2. Namely, the power supply voltage VDD is divided about equally by the reference resistor 130 and the reference digital resistor unit 127 by adjusting the reference digital resistor unit 127 to have approximately the same resistance as the reference resistance.

The digital logic unit 125 then determines the fourth control signal CTL4, the fifth control signal CTL5 and the sixth control signal CTL6 used above (step S4) and provides the fourth through sixth control signals CTL4, CTL5 and CTL6 as the first through third MOS transistors M1, M2 and M3 of the digital resistor unit 122 as the first through third control signals CTL1, CTL2 and CTL3 (step S5).

Therefore, the first MOS transistor M1 may have the same state as the fourth MOS transistor M4 of the reference digital resistor unit 127 as determined by the first control signal CTL1 and the second MOS transistor M2 may have the same state as the fifth MOS transistor M5 of the reference digital resistor unit 127 as determined by the second control signal CTL2 and the third MOS transistor M3 may have the same state as the sixth MOS transistor M6 of the reference digital resistor unit 127 as determined by the third control signal CTL3. As a result, the resistance of the digital resistor unit 122 is set to be the same as the resistance of the reference resistor 130.

In this manner, the voltage difference between the low voltage differential signal pair may be detected across the digital resistor unit 122, and the receiver unit 128 may restore the original digital signal Vin1 based on the detected voltage difference between the low voltage differential signal pair.

As described above, according to some embodiments of the invention, an operation of the digital resistor unit 122 disposed at the receiving end of the LVDS receiver 120 may be controlled by using a single reference resistor 130 that is exterior to the LVDS receiver 120. Thus, the LVDS receiver 120 may operate without an external resistor of the conventional art.

As the external resistor is not needed, a signal characteristic may be improved and/or the resistance of the digital resistor unit 122 may be easily modified by varying the reference voltage Vref input to the comparator 126 and/or the resistance of the external reference resistor 130.

For example, in order to adjust the resistance of the digital resistor unit 122 to a value that is half of the resistance of the reference resistor 130, the reference voltage Vref may be set as VDD/3. Alternatively, the reference resistor 130 may be replaced by another resistor with a desired resistance value. In this case, only the reference resistor 130 may be replaced regardless of the number of channels, compared with the conventional LVDS receiver in which the external resistors must be replaced one by one.

Figure 7:
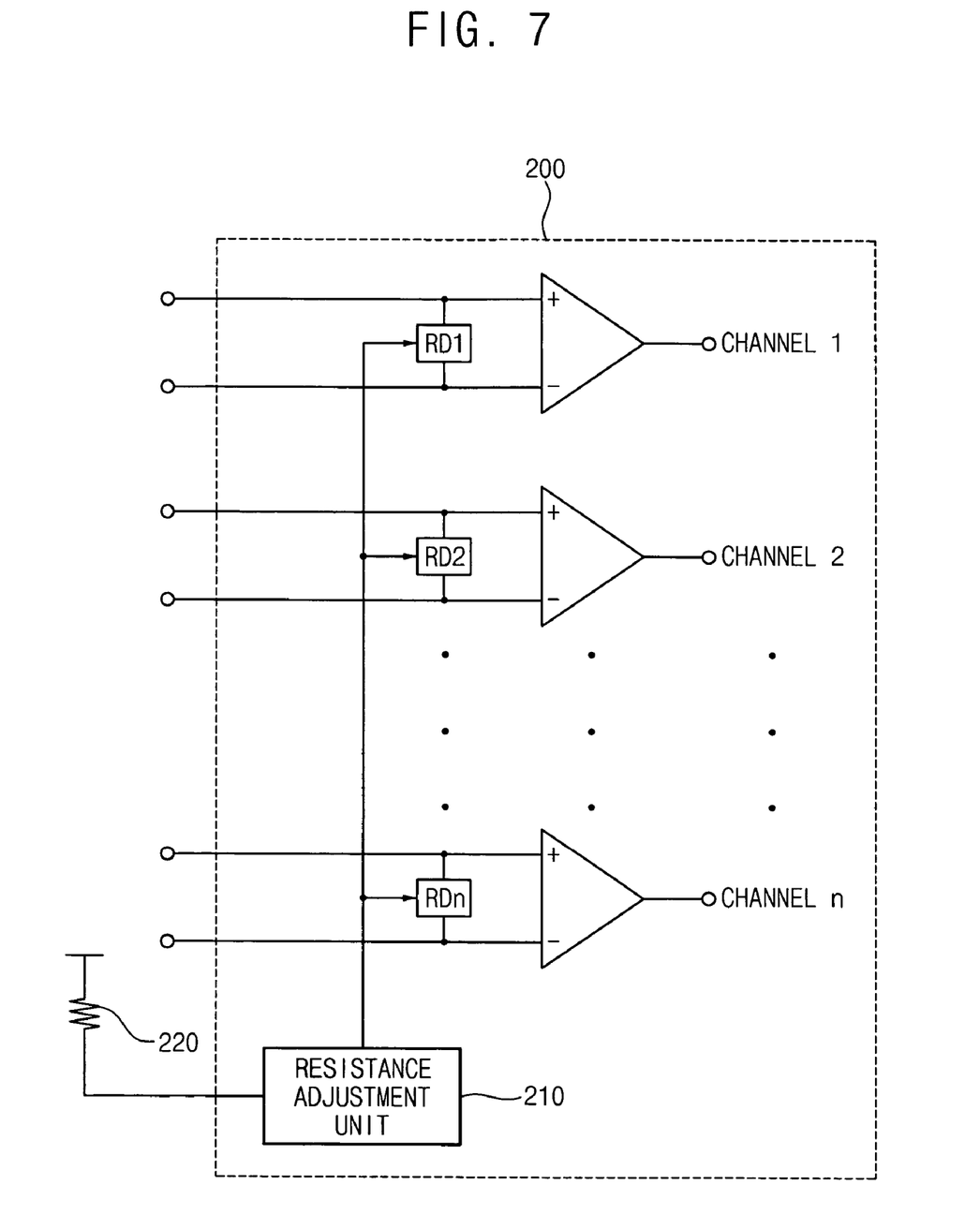
FIG. 7 is a circuit diagram illustrating a low voltage differential signaling (LVDS) interface system having n communication channels according to some embodiments of the invention.

FIG. 7 is a circuit diagram illustrating a low voltage differential signaling (LVDS) interface system having n communication channels according to some embodiments of the invention.

Compared with the conventional LVDS system shown in FIG. 2 in which n external resistors RL1 through RLn are required for n channels, only one external reference resistor 220 is included in an LVDS receiver 200 in FIG. 7. Therefore, there are n–1 less external resistors compared to the prior art, so that the use of external resistors may be reduced.

Figure 8:
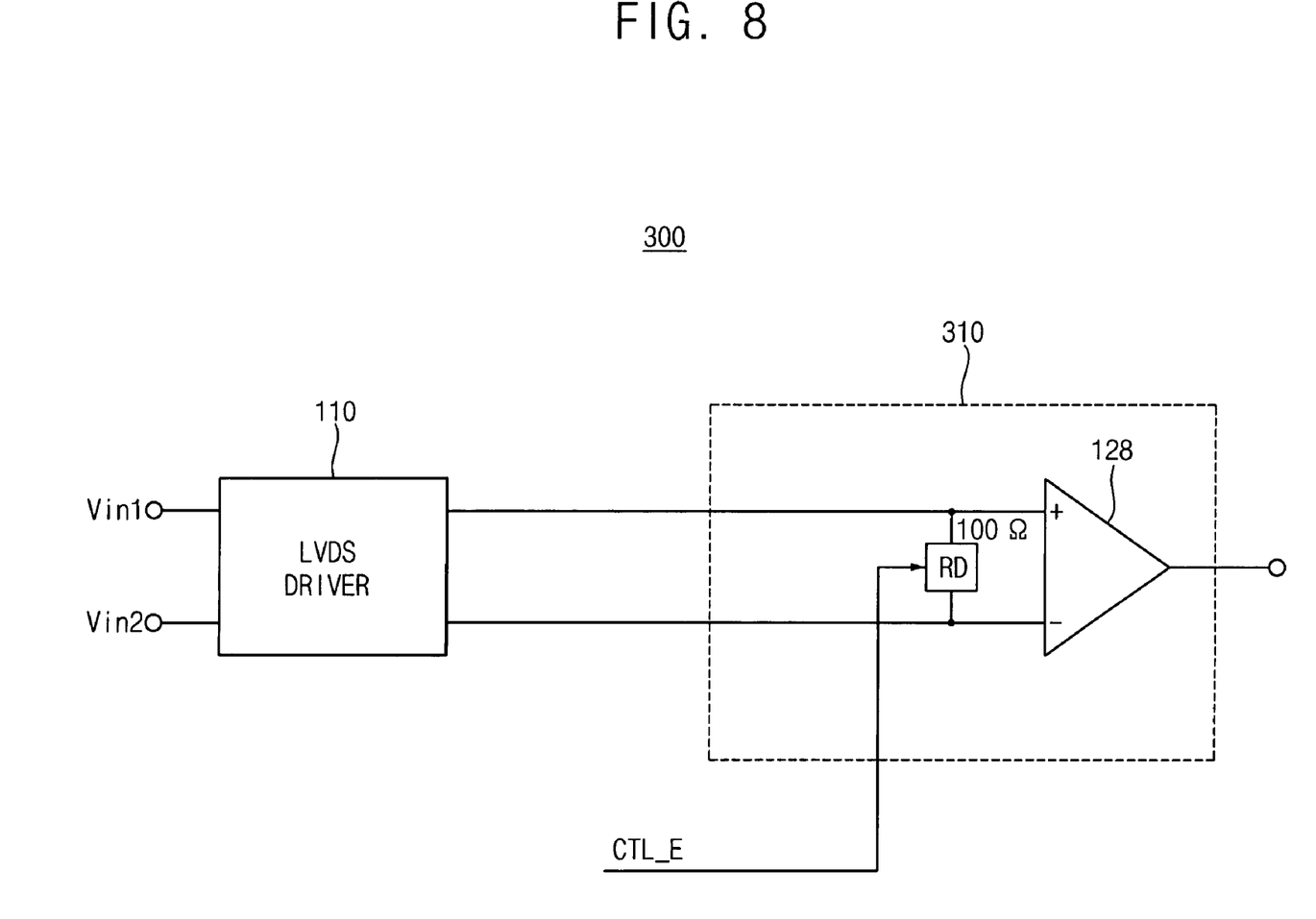
FIG. 8 is a circuit diagram illustrating a low voltage differential signaling (LVDS) interface system according to further embodiments of the invention.

FIG. 8 is a circuit diagram illustrating a low voltage differential signaling (LVDS) interface system 400 according to further embodiments of the invention.

Referring to FIG. 8, an LVDS interface system 400 according to some embodiments of the invention may include a low voltage differential signaling (LVDS) driver 110 and a low voltage differential signaling (LVDS) receiver 310. The LVDS receiver 310 includes a digital resistor unit RD and a receiver unit 128.

The LVDS driver 110 and the receiver unit 128 in FIG. 8 are similar to the LVDS driver 110 and the receiver unit 128 in FIG. 3 in form and function. Thus, the same reference numerals are used to refer to similar elements.

The digital resistor unit RD is disposed at a receiving end of the LVDS receiver 310. The digital resistor unit RD includes a transistor array in which a plurality of the transistors are controlled by an external control signal CTL_E that is externally provided. Namely, the digital resistor RD may be directly controlled by an external control signal.

The external control signal CTL_E may designate the resistance value of the digital resistor unit RD to a desired value, such as 100Ω. Therefore, the resistance of the digital resistor RD may be adjusted according to the external control signal CTL_E.

However, it may be difficult to vary the resistance value of the digital resistor RD using a single external control signal CTL_E. In that case, multiple digital resistor units RD may be used.

Figure 9:
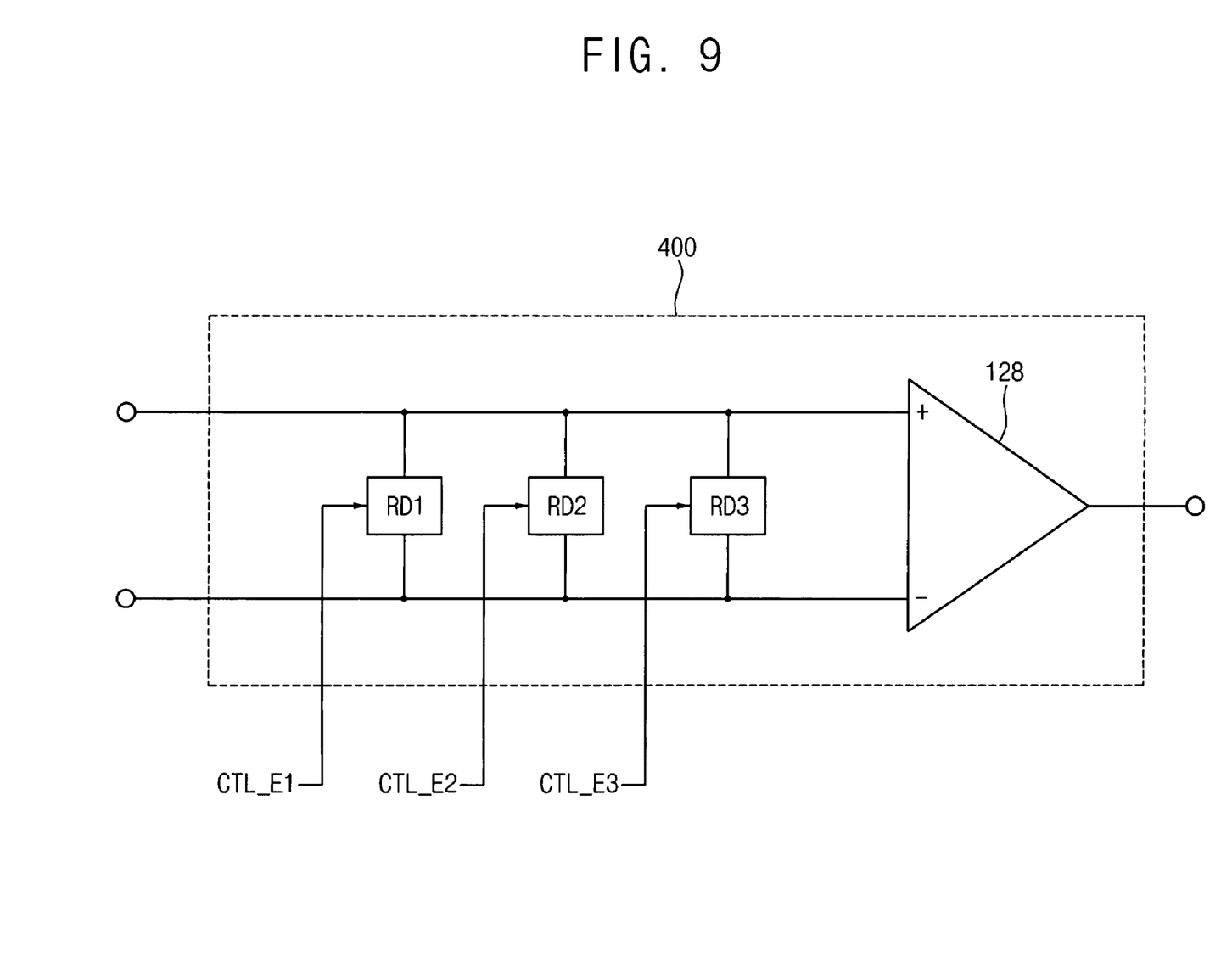
FIG. 9 is a circuit diagram illustrating a low voltage differential signaling (LVDS) interface system having a plurality of digital resistor units according to some embodiments of the invention.

FIG. 9 is a circuit diagram illustrating a low voltage differential signaling (LVDS) interface system 400 having multiple digital resistor units RD1-RD3 according to some embodiments of the invention.

Referring to FIG. 9, the LVDS receiver 400 includes a first digital resistor unit RD1, a second digital resistor unit RD2 and a third digital resistor unit RD3 that are coupled in parallel to one another.

The first through third digital resistor unit RD1, RD2 and RD3 may each be set to have a desired resistance value, such as 100Ω, by the first through third external control signals CTL_E1, CTL_E2 and CTL_E3. Therefore, by using the first through third external control signals CTL_E1, CTL_E2 and CTL_E3, a total resistance of the array of the first through third digital resistors units RD1, RD2 and RD3 may be adjusted.

For example, when only the first external control signal CTL_E1 is applied to the first digital resistor unit RD1 to set the resistance of the first digital resistor unit RD1 to 100Ω, the total resistance of the digital resistor unit array becomes 100Ω. In addition, when the first external control signal CTL_E1 and the second external control signal CTL_E2 are applied to the first and second digital resistor units RD1 and RD2, respectively, the total resistance of the digital resistor unit becomes 50Ω (the parallel resistance value of the first and second digital resistor units RD1 and RD2).

Similarly, when the first through third external control signals CTL_E1, CTL_E2 and CTL_E3 are applied to the first through third digital resistor units RD1, RD2 and RD3, respectively, the first through third digital resistor units RD1, RD2 and RD3 are set to have the resistance of 100Ω so that the total resistance value of the digital resistor unit array becomes 100/3Ω (the parallel resistance value of the first through third digital resistor units RD1, RD2 and RD3).

Thus, the total resistance of the digital resistor unit array may be adjusted by the external control signals CTL_E1, CTL_E2 and CTL_E3. Although it is illustrated that the LVDS receiver 400 includes three digital resistor units RD1, RD2 and RD3 in FIG. 9, the number of the digital resistor units may vary in different embodiments of the invention.

As described above, according to some embodiments of the invention, an LVDS receiver and an LVDS interface system having the LVDS receiver may include a transistor array that implements a digital type resistor instead of an external resistor. Therefore, the following effects may be achieved.

First, as the external resistor is removed, signal characteristics may be improved. Experimental results show that an effective period of a waveform of the low voltage differential signal may be enhanced and/or the jitter characteristic may be improved by about 15%.

Second, according to some embodiments of the invention, one or more external resistors may not be needed compared with the prior art so that installation may become easier and/or the cost may be reduced.

Third, operations of the transistors of the digital resistor unit may be controlled using at least one control signal, so that the resistance of the digital resistor may be easily modified compared with a conventional LVDS receiver in which the external resistors need to be replaced one by one to change the resistance thereof.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A low voltage differential signaling (LVDS) receiver, comprising:
   a digital resistor unit coupled between a pair of low voltage differential signal lines and configured to detect a voltage difference between a differential signal pair transmitted on the pair of low voltage differential signal lines indicative of a digital signal, wherein the digital resistor unit has a resistance value that may be varied in response to at least one control signal;
   a receiver unit configured to generate the digital signal in response to the detected voltage difference of the differential signal pair; and
   a resistance adjustment unit configured to provide the at least one control signal to the digital resistor unit to adjust the resistance value of the digital resistor unit;
   wherein the resistance adjustment unit is configured to generate the at least one control signal based on a resistance of a reference resistor; and
   wherein the resistance adjustment unit comprises:
   a reference digital resistor unit coupled in series to the reference resistor at a first node and configured to divide a power supply voltage;
   a comparator configured to compare a reference voltage with a voltage at the first node; and
   a digital logic unit configured to generate the at least one control signal in response to a comparison result from the comparator, and to provide the at least one control signal to the reference digital resistor unit such that the voltage at the first node is equal to the reference voltage, and further configured to provide the at least one control signal to the digital resistor unit.

2. The LVDS receiver of claim 1, wherein the digital resistor unit comprises a plurality of transistors that are coupled in parallel to one another, each of the transistors being turned on by a corresponding control signal from the resistance adjustment unit.

3. The LVDS receiver of claim 2, wherein each of the transistors comprises a MOS transistor.

4. The LVDS receiver of claim 2, wherein each of the transistors of the digital resistor unit has a resistance value that is different from each other transistor of the digital resistor unit.

5. The LVDS receiver of claim 1, wherein the at least one control signal is provided to the digital resistor unit such that a resistance of the digital resistor unit is approximately equal to a resistance of the reference resistor.

6. The LVDS receiver of claim 1, wherein the reference voltage is one half of the power supply voltage.

7. The LVDS receiver of claim 1, wherein the reference digital resistor unit comprises transistors coupled in parallel to one another, each of the transistors being turned on by the at least one corresponding control signal from the digital logic unit.

8. The LVDS receiver of claim 7, wherein the digital resistor unit has a configuration substantially similar to the reference digital resistor unit.

9. The LVDS receiver of claim 8, wherein the at least one control signal comprises a digital code having a number of bits, each of which corresponds to a respective transistor of the reference digital resistor unit.

10. A low voltage differential signaling (LVDS) interface system, comprising:
    an LVDS driver configured to generate a differential signal pair indicative of a digital signal to be transmitted on a pair of low voltage differential signal lines;
    a digital resistor unit coupled between the pair of low voltage differential signal lines and configured to detect a voltage difference between the differential signal pair that is transmitted from the LVDS driver, wherein the digital resistor unit has a resistance value that may be varied in response to at least one control signal;
    a receiver unit configured to restore the digital signal based on the detected voltage difference between the differential voltage signal pair;
    a resistance adjustment unit configured to provide the at least one control signal to the digital resistor unit to adjust the resistance value of the digital resistor unit; and
    a reference resistor, wherein the at least one control signal is generated in response to a voltage across the reference resistor;
    wherein the resistance adjustment unit comprises:
    a reference digital resistor unit coupled in series to the reference resistor at a first node, and configured to divide a power supply voltage;
    a comparator configured to compare a reference voltage with a voltage at the first node; and
    a digital logic unit configured to generate the at least one control signal based on a comparison result from the comparator, such that the voltage at the first node is approximately equal to the reference voltage, and further configured to provide the at least one control signal to the digital resistor unit.

11. The LVDS interface system of claim 10, wherein the digital resistor unit comprises a plurality of transistors that are coupled in parallel to one another, each of the transistors being turned on by a corresponding control signal.

12. The LVDS interface system of claim 11, wherein each of the transistors comprises a MOS transistor.

13. The LVDS interface system of claim 11, wherein each of the transistors of the digital resistor unit has a resistance value that is different from each other transistor of the digital resistor unit.

14. The LVDS interface system of claim 10, wherein the control signal is generated such that a resistance of the digital resistor unit is approximately equal to a resistance of the reference resistor.

15. The LVDS interface system of claim 10, wherein the reference voltage is one half of the power supply voltage.

16. The LVDS interface system of claim 10, wherein the reference digital resistor unit comprises transistors coupled in parallel to one another, each of the transistors of the reference digital resistor unit being turned on by the at least one corresponding control signal.

17. The LVDS interface system of claim 16, wherein the digital resistor unit has a configuration substantially similar to the reference digital resistor unit.

18. The LVDS receiver of claim 17, wherein the at least one control signal comprises a digital code having a number of bits, each of which corresponds to a respective transistor of the reference digital resistor unit.

* * * * *